US005368409A

United States Patent [19]

Marzullo et al.

[11] Patent Number: 5,368,409

[45] Date of Patent: Nov. 29, 1994

[54] LATCHING MECHANISM WITH INDEPENDENT BIASED LATCHING MEMBERS

[75] Inventors: Joseph H. Marzullo, Brookfield; Curtis Mrozinski, Newtown, both of Conn.

[73] Assignee: Pitney Bowes Inc., Stamford, Conn.

[21] Appl. No.: 950,360

[22] Filed: Sep. 24, 1992

[51] Int. Cl.⁵ ........ F16B 1/00

[52] U.S. Cl. ........ 403/324; 403/325; 403/330; 53/569; 74/570

[58] Field of Search ........ 403/321, 322, 330, 325, 403/324, 315; 53/569; 292/267; 74/570

[56] References Cited

U.S. PATENT DOCUMENTS

| | | | |
|---|---|---|---|
| 2,388,075 | 10/1945 | Peters | 292/267 |
| 2,914,895 | 12/1959 | Martin | 53/569 X |
| 2,915,863 | 12/1959 | Kummer | 53/569 X |
| 3,830,580 | 8/1974 | Slattery et al. | 403/325 X |
| 3,926,068 | 12/1975 | Jantzen et al. | 403/330 X |
| 4,169,341 | 10/1979 | Roetter et al. | 53/569 X |
| 4,262,471 | 4/1981 | Russell | 53/569 X |
| 4,337,609 | 7/1982 | Foster et al. | 53/569 |
| 4,854,233 | 8/1989 | Despot et al. | 403/330 X |
| 5,081,825 | 1/1992 | Mrozinski | 53/569 |

FOREIGN PATENT DOCUMENTS

| | | | |
|---|---|---|---|
| 430713 | 6/1935 | United Kingdom | 403/325 |

*Primary Examiner*—Randolph A. Reese
*Assistant Examiner*—Christopher J. Novosad
*Attorney, Agent, or Firm*—Charles R. Malandra, Jr.; Melvin J. Scolnick

[57] ABSTRACT

A mechanism for releasably latching an assembly which is pivotable between first and second side frame members in a machine, comprises a pivot rod mounted transversely between the first and second side members and pivotally biased away from the assembly. First and second levers are rigidly secured to the pivot rod at opposite ends of the pivot rod, and first and second latching members are independently and pivotally mounted to the first and second side frame members adjacent to the first and second levers respectively. The first and second latching members are biased towards the assembly. Each of the first and second latching members includes a notch for receiving a connecting rod in the assembly. Each of the first and second levers includes a guide pin for urging the first and second latching members away from the assembly when the first and second levers pivot towards the assembly.

5 Claims, 7 Drawing Sheets

LATCHING MECHANISM WITH INDEPENDENT BIASED LATCHING MEMBERS

FIELD OF THE INVENTION

The present invention relates to latching mechanisms and more particularly to such mechanisms for securely latching and unlatching a pivotable frame member in a machine.

BACKGROUND OF THE INVENTION

Latching mechanisms are well known for a variety of applications, including the latching of components or modules in machines. Generally, in machines, the latching mechanisms are used to lock machine assemblies or modules in an operating position and to release such assemblies or modules for maintenance or problem correction. However, the latching mechanism cannot interfere with the mechanical operation of the machine.

In a high speed inserting machine, the latching mechanism must adequately secure the assembly to withstand the forces and mechanical movement associated with normal operation. In some cases, depending on the location and function of the assembly in the machine, detents may be suitable for the latching required. In other cases a more positive latching is required to lock the assembly in place during operation.

In U.S. Pat. No. 5,081,825 issued to C. Mrozinski on Jan. 21, 1992 and assigned to the assignee of the present invention, an envelope flap unfolder and enclosure inserter with jam-clearing access is disclosed. The flap unfolder assembly is pivotally mounted over an enclosure transport to provide jam clearing access. A latching mechanism is disclosed to lock the flap unfolder assembly in place for normal operation. Because the flap unfolder assembly is located in a very confined area, a single latching mechanism is located at a side frame. The latching mechanism has proved to be inadequate to hold the flap unfolder assembly in place during normal operation of the machine. The bottom of flap unfolder assembly includes a guide plate against which insertion belts are biased urging flap unfolder assembly in an upwards direction. It has been determined that the operation of the flap unfolder assembly required that the assembly had to be captured at both sides to ensure proper operation of the flap unfolder assembly and the enclosure transport. However, the confined area of the flap unfolder assembly did not facilitate such a dual latching arrangement.

BRIEF DESCRIPTION OF THE DRAWINGS

A complete understanding of the present invention may be obtained from the following detailed description of the preferred embodiment thereof, when taken in conjunction with the accompanying drawings wherein like reference numerals designate similar elements in the various figures, and in which.

SUMMARY OF THE INVENTION

It has been found that a latching mechanism, with independent biased latching members located at both sides of the machine can be used to reliably latch and unlatch the mechanical assembly in a confined area.

In accordance with the present invention, a mechanism is disclosed for releasably latching an assembly which is pivotable between first and second side frame members in a machine. The mechanism comprises a pivot rod that is mounted transversely between the first and second side members and that is pivotally biased away from the assembly. First and second levers are rigidly secured to the pivot rod at opposite ends of the pivot rod. First and second latching members are independently and pivotally mounted to the first and second side frame members adjacent to the first and second levers respectively. The first and second latching members are biased towards the assembly. Each of the first and second latching members includes a notch for receiving a connecting rod in the assembly. Each of the first and second levers includes a guide pin for urging the first and second latching members away from the assembly when the first and second levers pivot towards the assembly.

DETAILED DESCRIPTION OF THE PREFERRED EMBODIMENT

The present invention relates to latching mechanisms that are suitable for use in confined areas. The following description of the preferred embodiment of the present invention includes the envelope flap unfolding assembly of a table top inserter.

Figure 1:
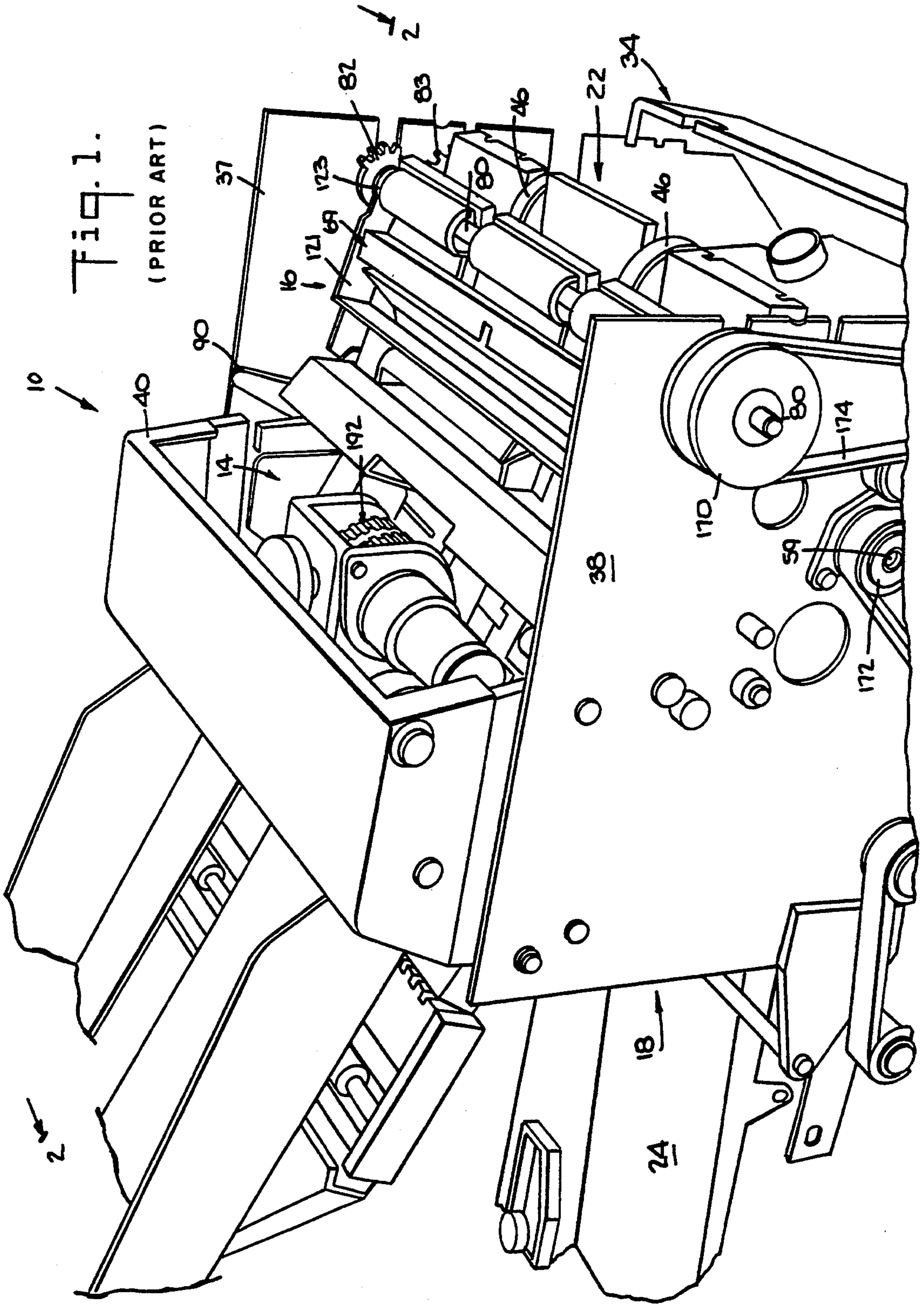
Fig. 1. (PRIOR ART)
FIG. 1 is a prior art perspective view of an apparatus for flapping envelopes and inserting documents into the flapped envelope.

Referring to FIG. 1, apparatus 10 feeds envelopes (not shown) seriatim from an envelope feeder 14 into an envelope flap unfolding assembly or envelope flapper 16 which flaps the envelope open and feeds the flapped envelope to a queuing station 18 where the envelope is held open for insertion therein of folded documents (not shown). The folded documents are fed to apparatus 10 from a document processing apparatus not shown in the drawings, entering apparatus 10 at the right in FIG. 1. The folded documents are received in apparatus 10 by an enclosure transporter 22 and fed to the queuing station 18 where they are inserted into the held-open envelope 12. The stuffed envelope is then discharged by the queuing station 18 onto a ramp 24 at the left of the apparatus as seen in FIG. 1 where the stuffed envelopes are collected for further processing.

Figure 2:
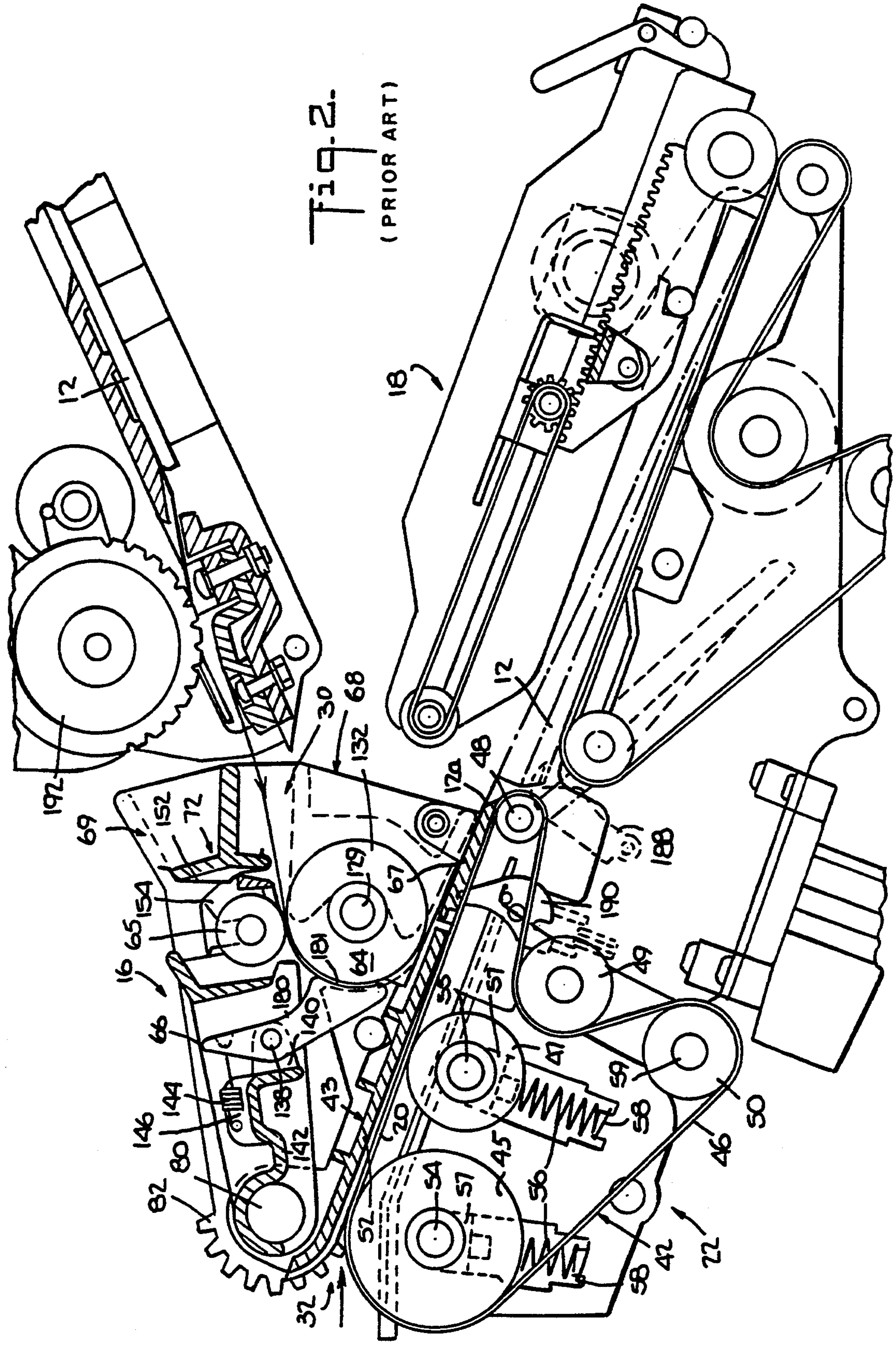
Fig. 2 (PRIOR ART)
FIG. 2 is a section view of the apparatus of FIG. 1 taken along lines 2—2 in FIG. 1.

Envelopes fed from envelope feeder 14 are moved by apparatus 10 through flap unfolding assembly 16 to queuing station 18 along an envelope flap unfolding path 30 (FIG. 2), and documents received by document transporter 22 are moved by apparatus 10 to queuing station 18 along a enclosure feed path 32. The invention is concerned with providing an adequate latching means which does not hinder flapping the envelopes and inserting enclosures therein, but which provides access to the enclosure feed path 32 so that jammed envelopes and enclosures may easily be removed. Apparatus 10 is constructed and the drive arranged so that parts thereof may be easily moved to substantially fully expose enclosure feed path 32, as well as the upstream end of queuing station 18 to facilitate removal of jammed envelopes and enclosures.

A more detailed description of the operation of flap unfolding assembly 16 and enclosure inserter and the jam clearing access therein, is provided in U.S. Pat. Nos. 5,081,825 and 5,191,751 both assigned to the assignee of the present invention, and both of which are incorporated herein by reference.

Figure 3:
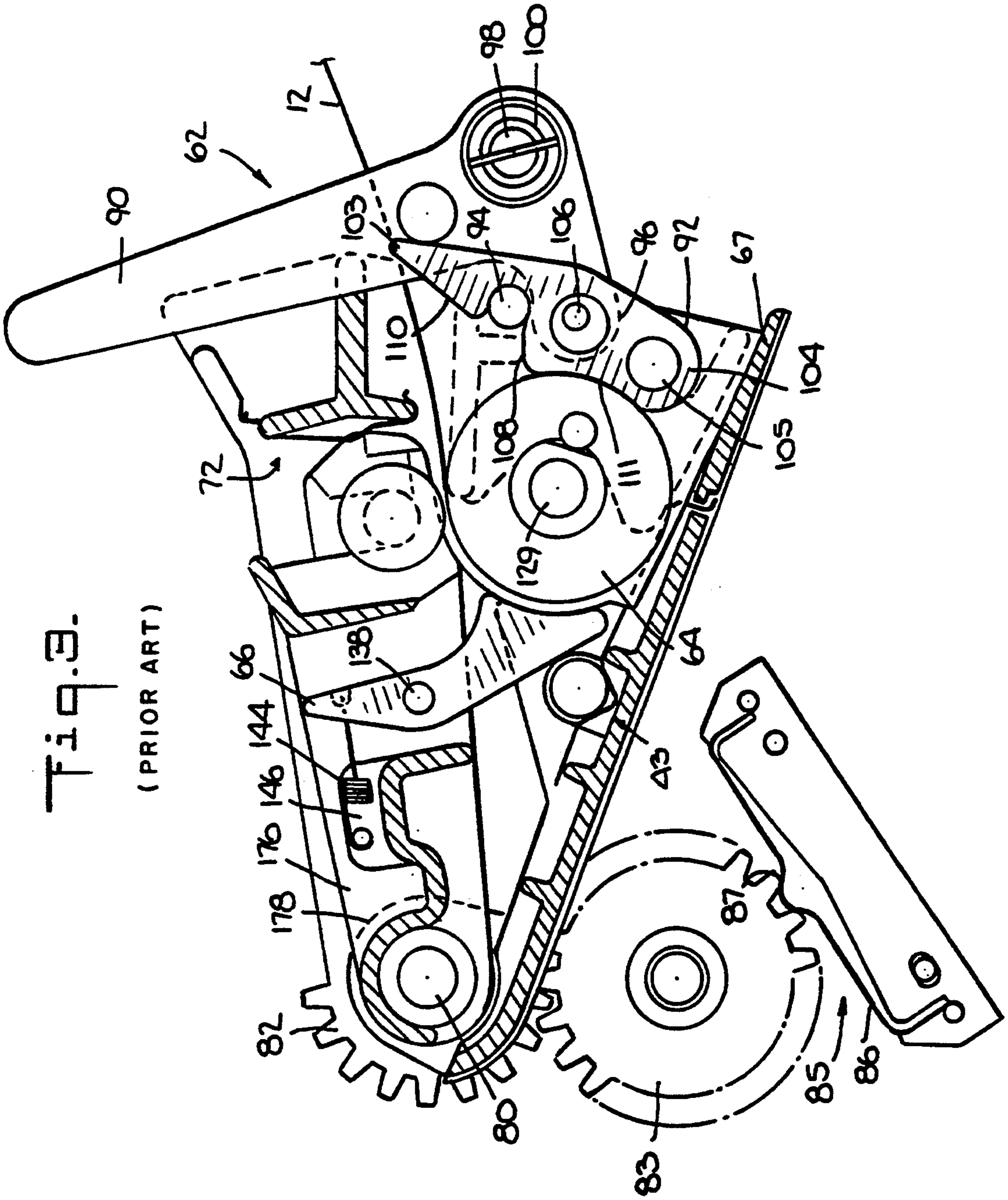
Fig. 3 (PRIOR ART)
FIG. 3 is a prior art section view of a single latch mechanism for releasable holding the envelope unfolding assembly in its operating position.

Referring to FIG. 3, the single latching mechanism 62 disclosed in U.S. Pat. No. 5,081,825 comprises a lever 90 pivotally mounted to frame side 37 (FIG. 1), a latch member 92 pivotally connected to lever 90 and to frame side 37, and rod 94 fixed to frame 68 which is engaged by latch member 92. Lever 90 is rotatably connected near end 96 thereof to side frame 37 via a pivot rod 98 suitably mounted to side frame 37. Lever 90 is locked onto pivot rod 98. A spring 100, wound on pivot rod 98, engaged at opposed ends thereof with side frame 37 and pivot rod 98, urges lever 90 in a clockwise direction. Latch member 92 is articulated intermediate its ends 103, 104 to end 96 of lever 90, and adjacent its end 104 to side frame 37 via pivot rods 106 and 105, respectively. A notch 108 is provided adjacent end 103 of latch member 92 for receiving rod 94 fixed to frame 68. FIG. 3 shows latching mechanism 62 in its latched position with lever 90 under action of spring 100 urging latch member 92 into latching engagement with rod 94.

Notch 108 includes an upper camming surface 110 and a lower camming surface 111. To unlatch latching mechanism 62, lever 90 is pivoted counterclockwise which pivots latch member 92 counterclockwise about pivot rod 105 so that lower camming surface 111 of notch 108 rides on rod 106 as notch 108 is moved out of engagement with rod 94. When frame 68 has been unlatched, spring 100 urges lever 90 and with it latch member 92 further clockwise from the positions depicted in FIG. 3. To latch latching mechanism 62, frame 68 is pivoted clockwise towards belts 46 of enclosure transporter 22 until rod 94 contacts the upper camming surface 110 of latch member 92. Continued pivoting of frame 68 pivots latch member 92 clockwise until rod 94 is engaged in notch 108. Part of the latching action of latching mechanism 62 derives from the resilient mounting of belts 46, i.e., as frame 68 is pivoted clockwise, it contacts belts 46 whose movement is resiliently resisted by the action of springs 56. Thus, after latching mechanism 62 latches, springs 56 urge frame 68 counterclockwise, which urges rod 94 into engagement with recess 108.

It has been found that the resilient relationship between the belts 46 and lower surface 52 of assembly 68 demands a dual latching to lock the assembly in place for operations. In accordance with the present invention, a dual latch mechanism 200 replaces the single latch mechanism 62.

Referring now to FIGS. 4–7, dual latch mechanism 200 includes a pair of levers 210 and 212 pivotally mounted to side frames 37 and 38, respectively, by means of pivot rod 214. Levers 210 and 212 each include a hub member 218 and set screws by which levers 210 and 212 are rigidly secured to pivot rod 214. Respective ends of pivot rod 214 extend through apertures 220 and 222 of side frames 37 and 38. A pair of torsion springs 224 and 226 are wound on the respective ends of pivot rod 214 and connected respectively at opposite ends thereof with side frames 37 and 38 and the respective end of pivot rod 214. Torsion springs 224 and 226 provide sufficient moment to pivot rod 214 and levers 210 and 212 to cause bias in a clockwise direction. Lever 210 includes a handle 228 for operator manipulation of the latch mechanism.

Associated with levers 210 and 212 are latch members 230 and 232, respectively. Each of latch members 230 and 232 include a pivot stud 234 and 236 rigidly connected thereto. Notches 240 and 242, which are located in the upper end of latch members 230 and 232, respectively, engage connecting rod 94 of flap unfolder assembly 68. Latch members 230 and 232 each have an upper camming surface 250 which engages connecting rod 94 as assembly 68 rotates towards latch members 230 and 232.

Pivot studs 234 and 236 are respectively located in apertures 254 and 256 of side frames 37 and 38. Studs 234 and 236 are pivotally mounted on frames 37 and 38 and biased towards assembly 68 by wire spring devices 260 and 262. In the preferred embodiment of the present invention, spring devices 260 and 262 each have first right angle bend of sufficient length to pass through a hole in the respective pivot studs 234 and 236. Each spring also includes a second right angle bend which is parallel to the spring axis and is placed through a receiving hole (not shown) in frames 37 and 38. Latch members 230 and 232 are biased towards assembly 68 because springs 260 and 262 are wound slightly during their assembly to side frames 37 and 38.

Levers 210 and 212 are bell crank shaped, having respective long arms 210*a* and 212*a* and respective short arms 210*b* and 212*b*. Longer arms 210*a* and 212*a* are for access by an operator to perform the unlatching of assembly 68. Shorter arms 210*b* and 212*b* include respective connecting pins 264 and 266 which pass through apertures 270 and 272 of latch members 230 and 232 respectively.

Figure 4:
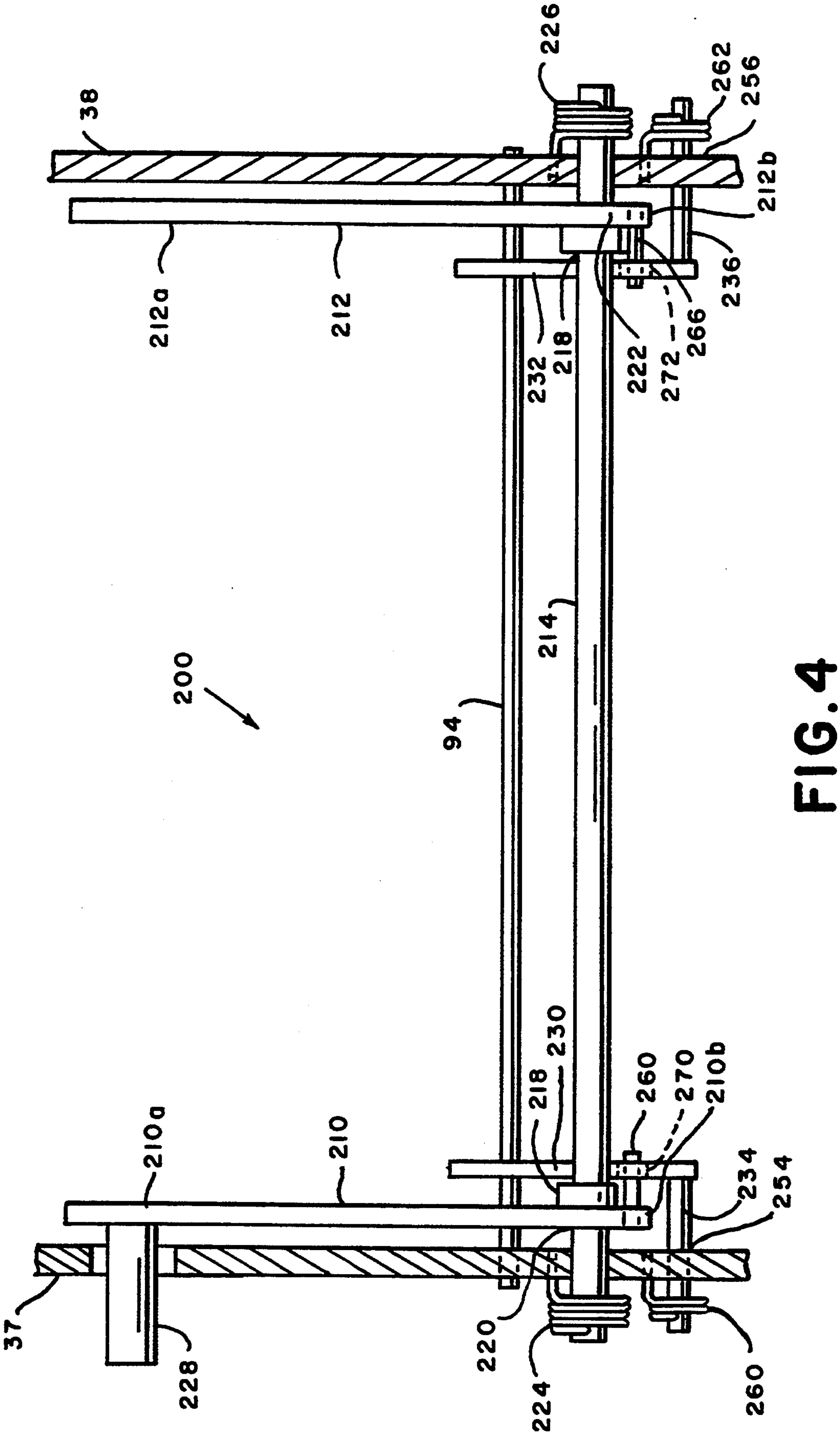
FIG. 4 is a front view of the latch mechanism according to the present invention.
Figure 5:
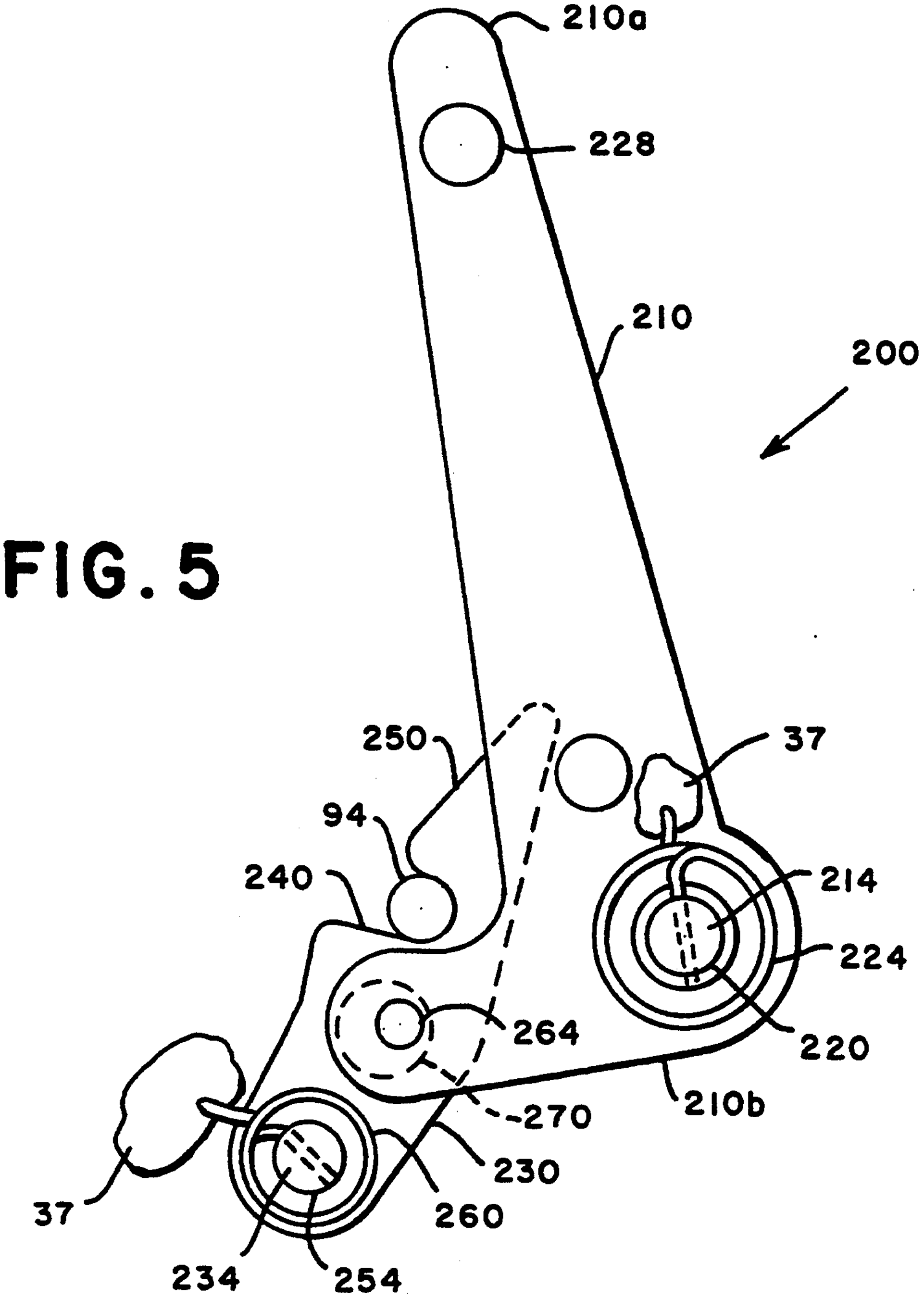
FIG. 5 is a side view of the latch mechanism of FIG. 4.
Figure 6:
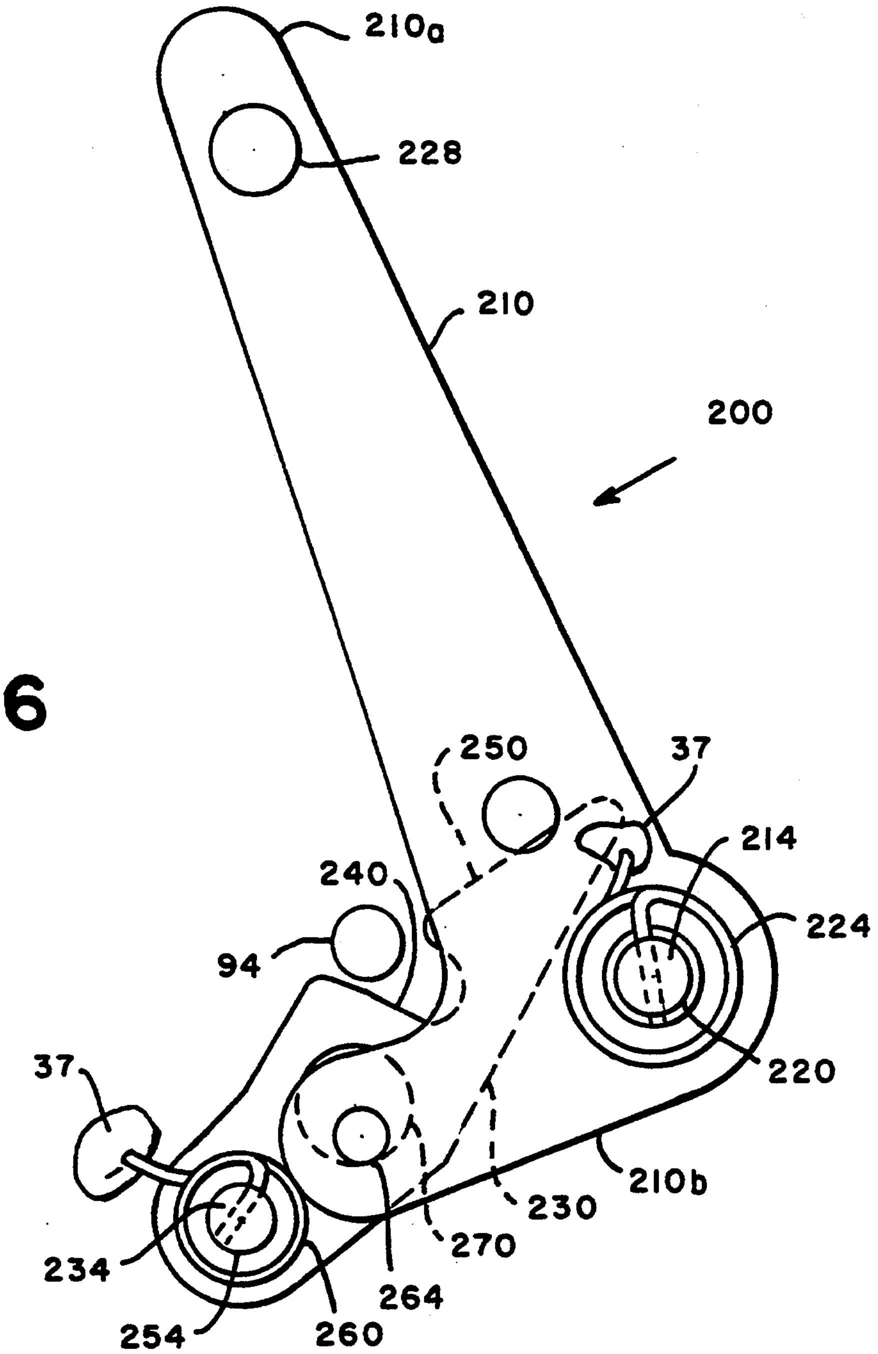
FIG. 6 is a side view similar to FIG. 5 but releasing the flap unfolder assembly.
Figure 7:
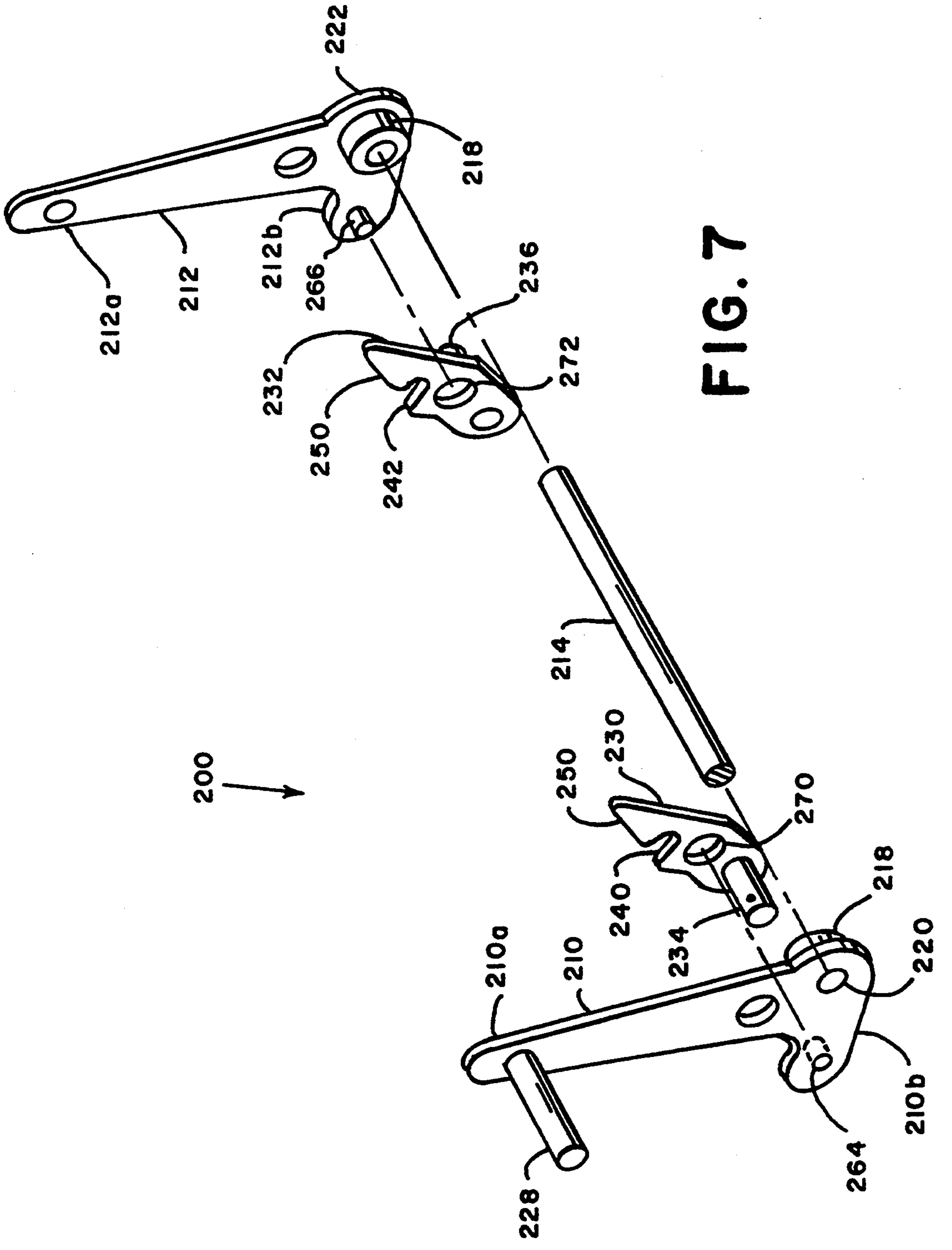
FIG. 7 is an exploded perspective view of the latch mechanism of FIG. 4.

In operation, rod 94 is locked in notches 240 and 242 of pawls 230 and 232. The counterclockwise (as seen in FIGS. 4 and 5) bias from springs 244 and 246 ensure that envelope flap unfolding assembly 16 remains locked in place until intentionally unlatched as follows.

To unlatch rod 94 and release flap unfolding assembly 16, one of levers 210 and 212 must be pushed towards envelope flap unfolding assembly 16. Since levers 210 and 212 are rigidly secured to pivot rod 214, when one lever is pivoted, the other pivots simultaneously. FIG. 4 shows latching mechanism 200 in its normal latched position. As shown in FIG. 5 when levers 210 and 212 are in a retracted position (counterclockwise pivot), connecting pins 264 and 266 press against the lower section of apertures 270 and 272 causing latch members 230 and 232 to simultaneously pivot away from assembly 68 thereby releasing connecting rod 94.

In returning envelope flap assembly 16 to its operating closed position, assembly 16 is pivoted towards latching mechanism 200. Although levers 210 and 212 are locked on common rod shaft 214 and therefore pivot together, latch members 230 and 232 are separately mounted to their respective frames 37 and 38 and biased towards assembly 16. This arrangement provides independent latching of rod 94 at latch members 230 and 232. This is particularly useful for latching in confined areas where the operator cannot observe the seating and locking of rod 94 to latching mechanism 200. Furthermore, latching mechanism 200 is a suitable latching means for assembly 68 because the above described independent latching by latch members 230 and 232 compensate for resilient resistance by springs 56 against assembly 68.

While the present invention has been disclosed and described with reference to a single embodiment thereof, it will be apparent, as noted above, that variations and modifications may be made therein. It is, thus, intended in the following claims to cover each variation and modification that falls within the true spirit and scope of the present invention.

What is claimed is:

1. A mechanism for releasably latching an assembly which is pivotable between first and second side frame members in a machine, comprising:

a pivot rod mounted transversely between the first and second side members and pivotally biased away from the assembly;

first and second levers rigidly secured to said pivot rod at opposite ends of said pivot rod;

first and second latching members independently and pivotally mounted to said first and second side frame members adjacent to said first and second levers respectively, said first and second latching members being biased towards the assembly, each of said first and second latching members including a notch for receiving a connecting rod in the assembly; and each of said first and second levers including a guide pin for urging said first and second latching members away from the assembly when said first and second levers pivot towards the assembly.

2. The latching mechanism of claim 1, wherein each of said first and second latching members include a guiding aperture in which said guide pin from the adjacent one of said first and second levers is located, said guiding aperture acting as a camming surface on which said pin moves to urge said latching members to pivot away from the assembly.

3. The latching mechanism of claim 1, wherein each of said first and second latching members includes a camming shaped section which guides said connecting rod into engagement with said notches when the assembly is moved to a closed position.

4. The latching mechanism of claim 1 wherein said pivot rod is pivotally biased to said first and second frame members by a pair of torsion springs connecting said pivot rod to said first and second frames.

5. The latching mechanism of claim 4 wherein said first and second latching members each include a pivot stud, said first and second latching members being pivotally biased to said first and second frame members by a pair of wire spring devices connecting said pivot studs to said first and second frame members respectively.

* * * * *